(No Model.)
A. O. QUINBY.
GATE HINGE.
No. 490,834. Patented Jan. 31, 1893.
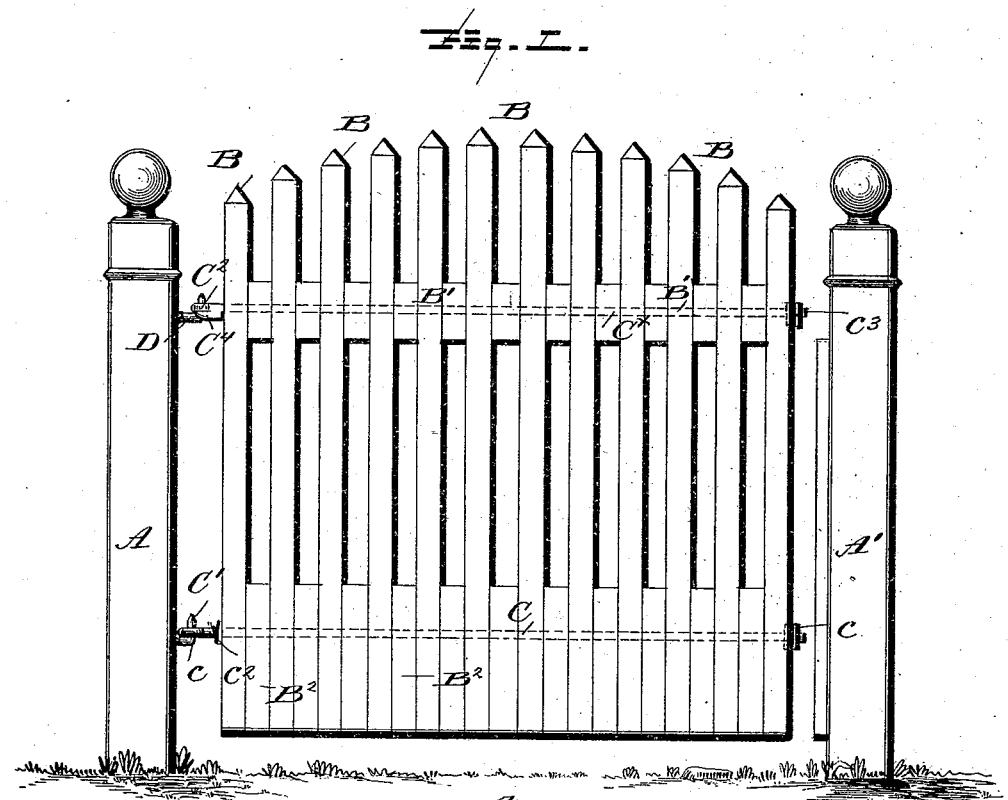
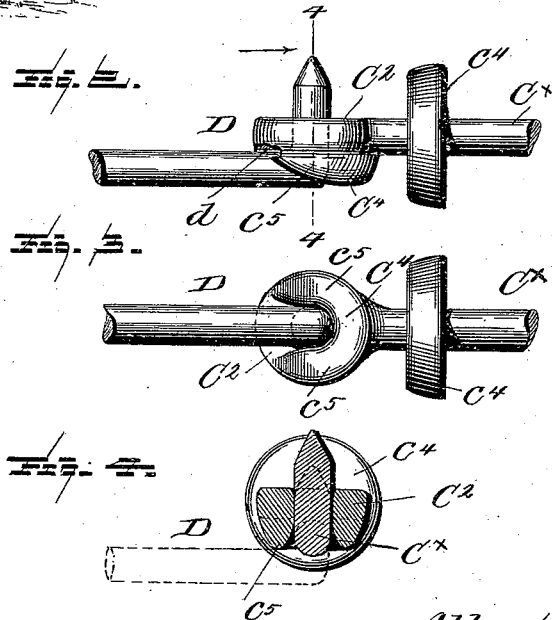
Witnesses
L. C. Hills.
E. H. Bond.
Inventor:
Albert O. Quinby
By E. B. Stocking
Attorney

UNITED STATES PATENT OFFICE.

ALBERT O. QUINBY, OF FRESNO, CALIFORNIA.

GATE-HINGE.

SPECIFICATION forming part of Letters Patent No. 490,834, dated January 31, 1893.

Application filed June 13, 1892. Serial No. 436,514. (No model.)

*To all whom it may concern:*

Be it known that I, ALBERT O. QUINBY, a citizen of the United States, residing at Fresno, in the county of Fresno and State of California, have invented certain new and useful Improvements in Gate-Hinges, of which the following is a specification, reference being had therein to the accompanying drawings.

This invention relates to certain new and useful improvements in hinges designed more particularly for use as a gate hinge and the objects and advantages thereof will hereinafter appear and the novel features will be specifically defined in the appended claim.

The invention is clearly illustrated in the accompanying drawings, which, with the letters of reference marked thereon form a part of this specification and which show, not only the construction of my improved hinge but also its mode of application.

In said drawings:—Figure 1 is a side elevation showing my hinge applied to a gate, Fig. 2 is an enlarged detail of the hinge in side elevation and with a portion broken away, Fig. 3 is a bottom plan thereof, and, Fig. 4 is a vertical section on the line 4 4 of Fig. 2 looking in the direction of the arrow.

Like letters refer to like parts in all the figures of the drawings.

While the present invention resides solely in the hinge still I have chosen to show its application to a gate which latter may be of any suitable construction but as shown consists of the pickets B interposed blocks B' near the top and blocks $B^2$ near the bottom.

A is the hinge post and A' the latch post.

The gate has at its lower end an eye $c$ held in the gate in any suitable manner, that shown being upon the end of the long rod C passed through the gate and having a nut $c'$ upon its threaded end at the edge of the gate, but this, of course, would not be essential in other forms of gate. The eye $c$ is adapted to engage over the pintle C' in the hinge post. The shank of the eye $c$ has a collar $c^2$ bearing against the adjacent edge of the gate.

D is the upper pintle on the hinge post and $C^2$ is the upper eye adapted to engage therewith and having a shank $C^\times$ held in the gate, in this instance being shown as long enough to pass entirely through the gate and receive a nut $c^3$ upon its other end (see Fig. 1) but of course in other forms of gate this will not be necessary. The shank of this upper eye may have a collar $c^4$ to bear against the edge of the gate or the half eye $C^4$ extended to serve the function of the collar $c^4$ as seen at $c^\times$ in Figs. 1 and 2. This half eye $C^4$ is formed upon the under side of the eye $C^2$ and is open upon the side nearest the hinge and extends in both directions from said open side in the form of a cam as seen at $c^5$ in the various views. These cam portions unite at their point of greatest thickness in axial line with the center of the opening at the side of said half eye. The pintle passes through the eye and also through the open sided eye, as seen in Figs. 3 and 4. The eye $C^2$ is formed upon its under face centrally opposite the axial line of the opening in the half eye with a notch $d$, as seen best in Fig. 2, so that when the gate is nearly closed this notch will ride down the horizontal pin of the pintle and bring the gate to its center. The peculiar location of the cam portions $c^5$ in close proximity to the normal line of the pintle is important as it insures the engagement therewith of the pintle almost instantly as the gate is thrown in either direction.

What I claim is:—

The combination with a pintle of a hinge eye having a shank and provided upon its under face with an open sided eye having oppositely extending cam portions and the eye proper formed upon its under face with a notch $d$ arranged centrally of the opening between the cam portions of the open sided eye, substantially as described.

In testimony whereof I affix my signature in presence of two witnesses.

ALBERT O. QUINBY.

Witnesses:
 A. W. ANDERSON,
 S. S. CRUTCHER.